United States Patent [19]
Eschelbach
[15] 3,739,362
[45] June 12, 1973

[54] MAGNETO-OPTICAL SIGNAL PROCESSOR

[75] Inventor: Richard E. Eschelbach, Palos Verdes Peninsula, Calif.

[73] Assignee: The Magnavox Company, Torrance, Calif.

[22] Filed: March 25, 1971

[21] Appl. No.: 128,122

Related U.S. Application Data

[63] Continuation of Ser. No. 700,395, Jan. 25, 1968, abandoned.

[52] U.S. Cl. .....340/174.1 M, 340/173 LM, 178/6.6, 340/174 YC, 350/151
[51] Int. Cl. .......................G11c 13/04, G11b 11/10
[58] Field of Search ................340/173 LM, 174.1 M

[56] References Cited

UNITED STATES PATENTS

| | | | |
|---|---|---|---|
| 3,196,206 | 7/1965 | Griffiths | 340/174.1 M |
| 3,224,333 | 12/1965 | Kock | 340/174.1 M |
| 3,229,273 | 1/1966 | Baaba | 340/174.1 M |
| 3,368,209 | 2/1968 | McGlauchlin | 340/174.1 M |
| 3,500,361 | 3/1970 | Cushner | 340/174.1 M |

*Primary Examiner*—Terrell W. Fears
*Attorney*—Smyth, Roston & Pavitt

[57] ABSTRACT

The present invention relates to the optical processing of information using a magneto-optical light modulator to spatially modulate light energy in accordance with the information. The magneto-optical light modulator includes a thin magnetic film having a spatial magnetic pattern in accordance with the information. The light energy is directed to the thin magnetic film to produce variations in the characteristics of the light energy in accordance with the spatial magnetic pattern. After the light energy has been spatially modulated the light energy is further processed using optical lenses so as to produce a desired transform of the spatially modulated light energy.

27 Claims, 11 Drawing Figures

Patented June 12, 1973

3,739,362

4 Sheets-Sheet 1

INVENTOR:
Richard E. Eschelbach

By Smyth, Roston & Pavitt

ATTORNEYS

INVENTOR:
Richard E. Eschelbach

By Smyth, Roston & Pavitt
ATTORNEYS

Patented June 12, 1973

3,739,362

4 Sheets-Sheet 3

INVENTOR:
Richard E. Eschelbach

By Smyth, Roston & Pavitt
ATTORNEYS

INVENTOR:
Richard E. Eschelbach

By [signature]
ATTORNEYS

MAGNETO-OPTICAL SIGNAL PROCESSOR

This application is a continuation of Ser. No. 700,395 filed Jan. 25, 1968 and now abandoned.

The optical processing of information is a field of use which is greatly increasing. There are many advantages to the use of optical processing as opposed to other types of processing systems such as electronic processing. For example, with optical processing two spatial degrees of freedom are present which may be used to represent two independent variables. The optical processing system can operate on both independent variables simultaneously. The simultaneous operation on two independent variables is an improvement over electronic processing systems since the electronic processing systems only have one independent variable.

In addition to the above advantages, optical processing systems include an additional property in that a Fourier transform relationship exists between the light amplitude distributions at the front and back focal planes of lenses which may be used in optical processing systems. This Fourier transform may be used so as to produce variable transform relationships on the light energy. The benefits which may be obtained with the use of optics versus conventional electronics to process electrical signals is demonstrated by reference to the following articles.

Cheatham et al., Optical Filters *Their Equivalence to and Difference From Electrical Networks*, 1954 IRE National Convention Record, pp. 6–12

Cutrona et al., *Optical Data Processing and Filtering Systems*, IRE Transactions on Information Theory, Vol. IT–6, June 1960 No. 3, pp. 386–400

These publications also demonstrate the manner in which the optical processing systems may be used so as to produce desired types of optical processing. For example, optical processing systems may be used to provide cross-correlation, auto-correlation, convolution, spectral analysis, antenna pattern analysis, match filtering, etc.

Electronic systems for performing the above types of processing exist, but these electronic systems suffer from the disadvantages inherent in systems possessing a single independent variable so that the electronic systems have one degree of freedom. As indicated above, in the optical system two independent variables are available which gives two degrees of freedom. Thus, the optical systems can readily handle two-dimensional operations without resort to scanning, which would be necessary with the electronic system.

Alternatively, in one-dimensional processing with a single varying parameter, the second dimension may be used to provide a number of independent computing channels for varying values of the unused variable. In the optical system, the number of independent one-dimensional channels is limited only by the number of positions which may be resolved across the optical system aperture. The two-dimensional nature of the optical processing system may, therefore, be used to provide a two-dimensional processor or to provide a multichannel single dimensional processor.

For particular types of operations, the use of the optical processor may permit a considerable simplification of equipment and eliminate the necessity for bulky systems to perform the operations using electronic processing. The major advantages with the use of the optical processing systems, therefore, stem from the Fourier transform properties of optical lenses as indicated above and also because of the ability of cylindrical lenses to handle the many parallel channels while still using reasonably-sized optics.

Although the inherent advantages stemming from the use of optical processing systems have been apparent for many years, optical processing has not been used to the degree which would have been expected. The problems encountered in the optical processing of input information such as electrical signals centers on the limitations of available spatial light modulators. The standard technique for modulating the light energy is to use photographic film. The photographic film acts as the spatial light modulator in accordance with the pattern on the photographic film. For example, if it is desirable to spatially modulate the light energy in accordance with electrical signals, one technique is to photograph the line scan output of a cathode ray tube display that is intensity modulated with the electrical signals. Other types of spatial light modulators which have been tried, for example, are those using the Sears-Debye effect in liquids or solids.

The photographic film technique gives a large time bandwidth product but has the disadvantage of requiring a time delay to process the film before the signals can be processed. The spatial modulator using the Sears-Debye effect have large bandwidths but are limited on the available time aperture by the velocity of sound in the material. The present invention is therefore directed to optical processing systems using magneto-optical light modulators so as to spatially modulate the light energy in accordance with input information and to produce an improved optical processing system.

The magneto-optical light modulators used in the present invention incorporate a thin magnetic film which has a spatial pattern of magnetic information in accordance with the input information. The light energy is directed to the thin film so as to spatially modulate the light energy in accordance with the spatial pattern of magnetic information on the thin film. The light energy may be either amplitude modulated or phase modulated in accordance with the manner in which the magneto optical light modulator is used.

The magneto-optical light modulator included in the improved optical processing system of the present invention uses the Kerr magneto-optical effect which produces a change of either rotation or amplitude of light energy reflected from a ferromagnetic surface in accordance with the magnetic state of the surface. With the longitudinal Kerr magneto-optical effect, the magnetization is parallel to the plane of incidence of the polarized light and the light energy experiences changes in rotation upon the reflection of the light energy from the thin magnetic film. With the transverse Kerr magneto-optical effect the magnetization is perpendicular to the plane of incidence of the polarized light and the light energy experiences changes in amplitude upon the reflection of the light energy from the thin magnetic film. The changes in the light energy may be either between two discrete states or may be continuous between limits in accordance with the type of magnetization of the thin film. For example, if the thin film is magnetized along the easy axis, the state of magnetization of the thin film switches between two discrete states. If the thin film is magnetized along the hard axis, the magnetization of the thin film may be changed continuously between two limits. The present invention contemplates the use of either type of magnetization.

The optical processor of the present invention uses the magneto-optical modulators as explained above and the light energy which is processed may be either non-coherent or coherent. For example, an ordinary incandescent light source would produce non-coherent light energy. The use of a laser would produce coherent light energy. There are certain advantages in the use of a coherent system since the use of a coherent system allows for the elimination of error terms which are produced during the optical processing.

As indicated above, the improved optical processing system of the present invention uses a magneto-optical light modulator. One specific example of a magneto-optical light modulator is an optical prism which has deposited on one surface a thin film of magnetic material. A magnetic tape is disposed adjacent to the thin film of magnetic material and the magnetic states on the magnetic tape induce corresponding magnetic states in the thin film. The magnetic tape, of course, may be stationary or may be continuously recorded with the desired information. The magnetic tape may be moved relative to the thin film so that the information on the thin magnetic film may be varied in accordance with the continuous recording of the information on the magnetic tape.

A light source is used to direct light energy towards the thin magnetic film. The light energy may be collimated and passed through a polarizer so as to control the plane of polarization of the light energy which is directed to the thin magnetic film. The optical prism maximizes the amount of light energy which is reflected from the thin magnetic film. For example, the optical prism and the thin magnetic film may be designed so as to produce a total internal reflection of the light energy directed towards the thin film.

As the light energy is reflected from the thin film, the spatial magnetic states on the thin magnetic film produce changes in the light energy at the corresponding spatial positions. In the use of the magneto-optical light modulator with longitudinal magnetization the magnetic states produce changes in the rotation of the light energy in accordance with the magnetic states. However, it is to be appreciated that the thin film may be magnetized in a transverse direction so as to produce changes in amplitude of the light energy. With the longitudinal magnetization where the light energy is rotated upon the reflection from the thin film, the rotated light energy may be directed to an analyzer which changes the rotation of the light energy into variations in the amplitude of the light energy at spatially distributed positions so as to produce an output signal which has a spatially varying output light intensity at various positions.

As indicated above, it is also to be appreciated that the thin magnetic film may be magnetized either along the easy axis or the hard axis. When the thin film is magnetized along the easy axis, the magnetic states are either in one of two values and the thin film exhibits essentially a square hysteresis loop. This type of magnetization is useful in digital work. When the thin film is magnetized along the hard axis, the magnetic states vary continuously between two limits so as to produce a continuously varying magnetic signal in accordance with the degree of magnetization.

In the general use of the optical processor of the present invention, the light modulator spatially modulates the light energy in accordance with the input information and this spatially modulated light energy is then optically processed using optical lenses. The processing system may be used so as to produce an additive, subtractive, multiplitive or divisive function on the light energy. Also more than one magneto-optical modulator may be used so as to compare or process the light energy in accordance with more than one spatially varying signal.

As a specific example, the present invention includes an improved correlator which uses a pair of magneto-optical spatial light modulators and wherein the correlation is in accordance with amplitude changes of the light energy rather than with phase changes. Each light modulator, therefore, is a complete spatial amplitude light modulator so as to correlate the information in accordance with the amplitude changes. The improved correlator of the present invention may use either coherent or non-coherent light energy. When the light energy is coherent, for example when the light source is a device such as a laser, the correlator may include means for eliminating error terms.

The present invention, therefore, is directed to the improved optical processor using the magneto-optical light modulator, as indicated above, and particular examples of the optical processor of the present invention may be seen with reference to the following description and drawings wherein.

Figures 1, 2:
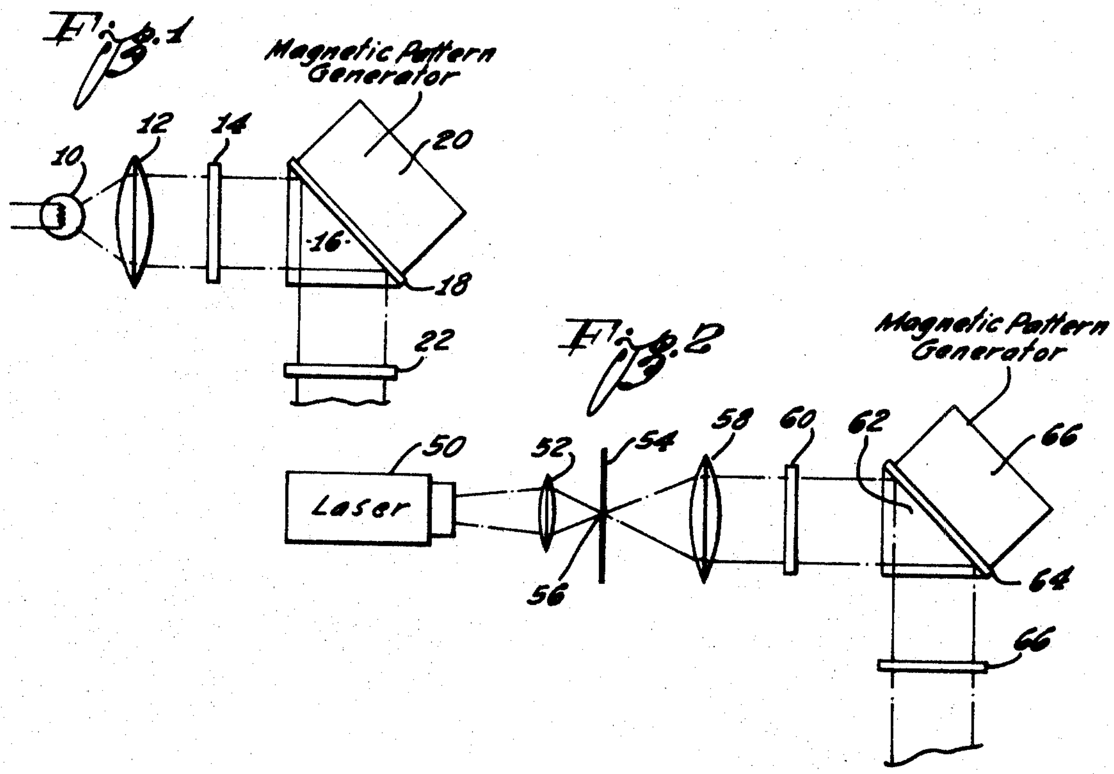
FIG. 1 is a magneto-optical spatial light modulator using a non-coherent light source.
FIG. 2 is a magneto-optical spatial light modulator using a coherent light source.

In FIG. 1, a basic non-coherent spatial light modulator is shown. The spatial light modulator as shown in FIG. 1 uses the longitudinal Kerr magneto-optical effect but it is to be appreciated and as will be explained later, the spatial light modulator may also use the transverse Kerr magneto-optical effect. In FIG. 1 a source of light 10, such as an incandescent light source, directs light energy towards a collimating lens 12 and is passed through a polarizer 14. The polarizer 14 polarizes the light energy to lie in a particular plane of incidence. The light energy then passes through an optical prism 16 and is directed to a thin magnetic film 18. The optical prism 16 efficiently couples the polarized light to the thin magnetic film 18 and provides for a total internal reflection of the light energy directed to the thin film so as to maximize the light energy reflected from the thin magnetic film.

A magnetic pattern generator 20 spatially modulates the magnetic states of the thin magnetic film 18. For example, one type of magnetic pattern generator which may be used is linearly recorded magnetic tape having a spatial pattern of information. If the magnetic tape is maintained in a stationary position, the spatial pattern is transferred to the thin magnetic film so as to produce a fixed pattern of magnetic information on the thin film in this stationary position. However, the magnetic tape may be moved so as to produce a time-varying spatial pattern of magnetic information on the thin film. The magnetic tape pattern generator in combination with the thin magnetic film, may be used as a direct replacement of the photographic film used in the prior art spatial light modulators, except that the delay experienced in the processing of the photographic film is drastically reduced since the only delay in the use of the moving magnetic tape pattern generator is in the transit time between the recording position of the information and the readout position of the spatial light modulator. It is to be appreciated, however, that other types of light modulators may be used which operate in real time.

As the light is reflected from the thin magnetic film 18, rotations are produced in the light energy in accordance with the spatial magnetic pattern when the thin magnetic film is magnetized in a direction to produce the longitudinal Kerr magneto-optical effect. It is to be appreciated that thin magnetic film may be magnetized in a direction so as to produce the transverse Kerr magneto-optic effect so as to directly amplitude modulate the output from the thin magnetic film 18.

In the magneto-optical light modulator shown in FIG. 1, the longitudinal Kerr magneto-optical effect is assumed so that the light energy from the thin magnetic film 18 is directed to an analyzer 22. The analyzer 22 is used to convert the spatial changes in rotation of the light energy to spatial changes in intensity of the light energy. The particular intensity of the light energy is in accordance with the relative positions of the analyzer 22 and the polarizer 14 and these elements are, therefore, adjusted so as to produce the desired intensity output. It can be seen, therefore, that light energy produced by the source 10 is converted to a light output having spatially varying intensities in accordance with the pattern of information on the thin magnetic film 18.

FIG. 2 illustrates a basic coherent light modulator. In FIG. 2, a source of light 50, such as a laser, produces a beam of coherent light energy. Since this coherent light energy usually has a fairly narrow beam size, the light energy is directed to a beam expander including an objective lens 52 which focuses the light through a sheet 54 which contains a pinhole 56. The coherent light energy passes from the pinhole 56 and is directed to a collimating lens 58 to produce an expanded beam of collimated coherent light energy.

The expanded collimated beam of coherent light energy is passed through a polarizer 60 so as to polarize the coherent light energy to a desired plane of incidence. The spatial light modulator includes the optical prism 62, the thin magnetic film 64 and the magnetic pattern generator 66. These elements are substantially identical to the similar elements shown in FIG. 1. As the light emerges from the prism 62, it passes through the analyzer 66. The analyzer 66 is set so as to produce a spatially varying output signal having variations in light intensity in accordance with the information spatially distributed on the thin magnetic film 64.

Figure 3:
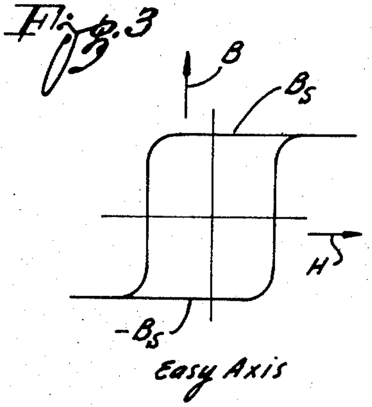
FIG. 3 illustrates the magnetization of the thin magnetic film along the easy axis.
Figure 4:
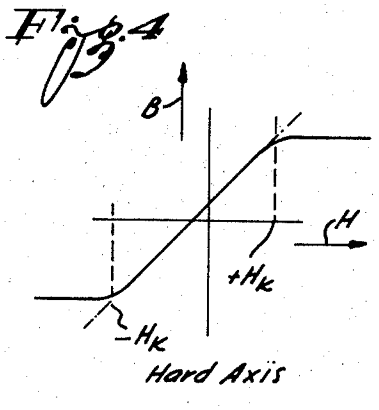
FIG. 4 illustrates the magnetization of the thin magnetic film along the hard axis.

FIGS. 3 and 4 show two types of magnetization of the thin films 18 and 64 illustrated in FIGS. 1 and 2. FIG. 3 illustrates the magnetization induced in the thin magnetic film along the easy axis. In the easy axis magnetization shown in FIG. 3, the magnetization induced in the thin magnetic film can only switch between two values, $B_s$ and $-B_s$, with changes of the inducing field H. The easy axis magnetization, therefore, can produce only two values of rotation of the light energy reflected from the thin magnetic film. Therefore, only two intensity values can be produced from the light energy which passes from the analyzers 22 and 66 shown in FIGS. 1 and 2. The easy axis magnetization produces a curve as shown in FIG. 3 and this type of curve is commonly referred to as a square hysteresis loop. One advantage with the easy axis magnetization is that the thin magnetic film exhibits a strong memory since the magnetization must be driven to one of the two positions.

The easy axis magnetization may often be used in spatial processing but a larger percentage of optical processing cannot work with only two values of light intensity. It is, therefore, desirable to provide for a spatial light modulation which produces a continuous change in light intensity. The continuous change in light intensity may be accomplished by using the type of magnetization shown in FIG. 4 which magnetization is commonly referred to as hard axis. For the hard axis magnetization, the induced magnetization B in the thin film and, therefore, the rotations produced in the light energy, are nearly proportional to the inducing field H until the values of $\pm H_k$ is reached. However, between the values of $\pm H_k$ there is a linear portion which may be used to produce linear changes in light output from the analyzers 22 and 66. It is to be appreciated that either type of magnetization may be used for the light modulators of FIGS. 1 and 2 depending upon the particular type of optical processing desired.

Figure 5:
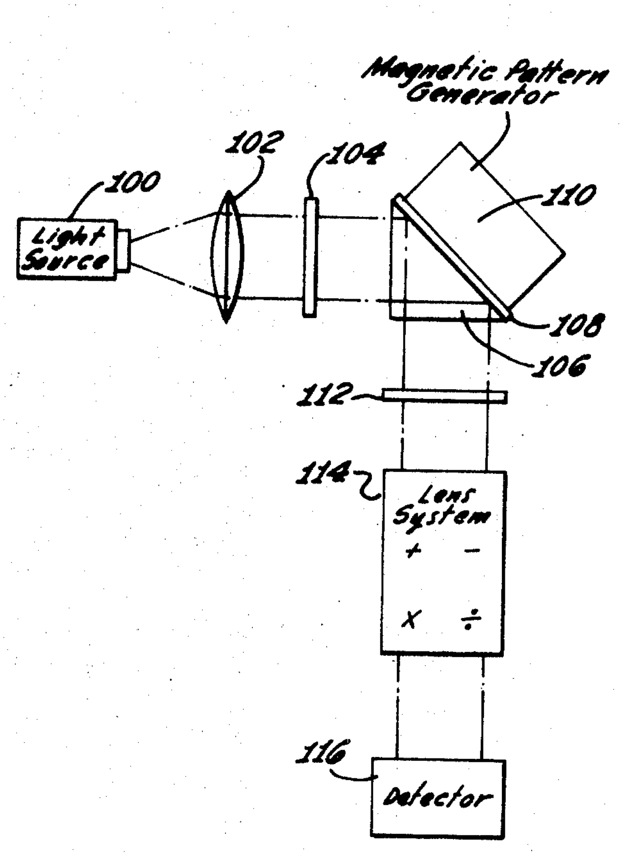
FIG. 5 is a general magneto-optical processing system using a magneto-optical light modulator and showing the general functions which may be performed by the optical processor of the present invention.

FIG. 5 illustrates a generalized form of an improved optical processing system using a magneto-optical light modulator. In FIG. 5, a light source 100, which may be either coherent or non-coherent, directs light energy to a collimating lens 102 to produce a collimated beam of light energy. The light energy then passes through a polarizer 104 to polarize the light energy in a particular desired plane of polarization. It is to be noted that the polarizer shown in FIG. 5 and the polarizers shown in the other figures are used as an aid to allow the visual alignment of the optical processing systems by observing static patterns by setting the position of the analyzer for the operating curve extinction point. However, for a-c operations of the optical processing systems, this polarizer may be removed, thereby providing for an increase in the usable light input to the spatial light modulator.

The spatial light modulator includes an optical prism 106 which supports a thin magnetic film 108. A magnetic pattern generator 110 produces a spatially varying pattern of magnetic information in the thin magnetic film 108. The light energy on reflection from the thin magnetic film 108 produces rotations in the light energy and the rotations are converted to variations in light intensity by an analyzer 112. The spatially verying light output signal from the analyzer 112 may now be modified by a processing system 114 which may include optical lenses. The processing system 114 may perform any of the normal functions such as addition, subtraction, multiplication and division, or combinations of these, so as to process the spatially varying light output signal from the analyzer 112 in a desired manner.

The output from the processing system 114 is then directed to a detector 116. In a sense, the system of FIG. 5 is a computer in that the optical processing in accordance with various arithmetic functions produces a computation on the spatially varying light output signal from the analyzer 112. It should also be appreciated that additional magnetic pattern generators may be included in the processing system so as to produce processing such as correlation or match filtering. The optical processor of the present invention is therefore extremely versatile in that it may operate on the spatially varying output light signal in different ways. One particular example of an optical processor constructed in accordance with the present invention is the improved correlator shown in FIG. 6.

Figures 6, 7:
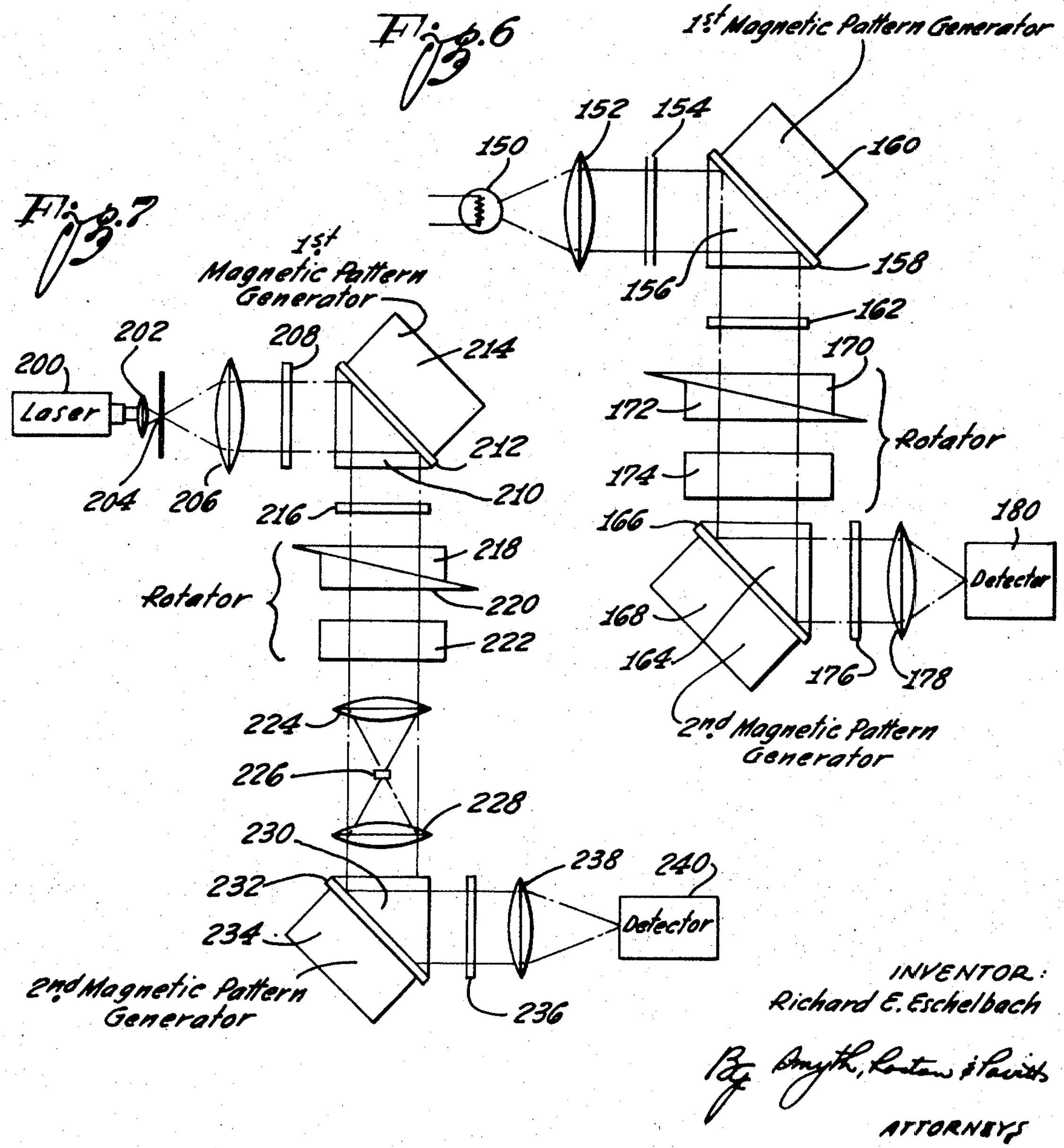
FIG. 6 is a non-coherent correlator using spatial amplitude modulation from successive surfaces so as to correlate the information recorded on the successive surfaces.
FIG. 7 is a coherent correlator using spatial amplitude modulation from successive surfaces so as to correlate the information recorded on the successive surfaces.

In FIG. 6, a light source 150 produces light energy which is directed to a collimating lens 152. The collimating lens 152 produces a collimated beam of light energy which is polarized by the polarizer 154. The output from the polarizer 154 is directed through an optical prism 156 to a thin magnetic film 158. The spatial pattern of magnetic information on the thin magnetic film 158 is controlled by a first magnetic pattern generator 160. The spatially varying light output from the thin film 158 is then directed to an analyzer 162. The first spatial light modulator, therefore, consists of the polarizer 154, the thin film 158, the first magnetic pattern generator 160, and the analyzer 162, and converts the input light energy which has been polarized in a particular plane of incidence into a spatially varying light output. The polarization of the light output is a function of the angle of the analyzer and the spatial pattern of the light intensity is in accordance with the pattern of information on the thin film 158.

The spatially varying light output from the first light modulator is directed to a second light modulator including a prism 164, a thin magnetic film 166 and a second magnetic pattern generator 168. Since it has been assumed that the thin magnetic film has been magnetized in a direction to produce the Kerr longitudinal magneto-optical effect, the light input to the second light modulator must be polarized in the plane of incidence of the thin magnetic film 166. The rotation of the plane of polarization of the light energy may be accomplished by a light rotating device such as a soliel compensator which uses two pieces of calcite with orthogonal optical axes to rotate the light. The amount of rotation is in accordance with the thickness of the soliel compensator. The first piece of calcite includes two split wedges 170 and 172 and the second piece of calcite is a single rectangular section 174. The thickness of the first piece of calcite is varied by moving the wedges 170 and 172 relative to each other so as to control the amount of rotation. The light energy is, therefore, properly polarized for direction on the thin magnetic film 166.

The output from the thin magnetic film 166 passes through an analyzer 176 so as to produce an output signal which has spatial distribution of light energy having an intensity in accordance with the correlation of the information on the first thin magnetic film 158 and the second thin magnetic film 166. The correlated output signal from the analyzer 176 is coupled through an integrating lens 178 to a photodetector 180 so as to produce an output signal having characteristics in accordance with the correlation between the information on the first thin magnetic film 158 and the information on the second thin magnetic film 166.

The correlator shown in FIG. 6 has certain advantages over the correlator shown in copending application Ser. No. 632,757, filed Apr. 21, 1967, in the name of Stanton H. Cushner now U.S. Pat. No. 3,500,361 and assigned to the same assignee as the instant case. In the prior copending correlator, the correlation was accomplished by the use of two successive thin magnetic films in the light path and the prior correlator had to be operated at the polarizer-analyzer extinction point so as to produce a multiplication and thereby produce a true correlation. However, in the correlator shown in FIG. 6 of this application, each thin magnetic film is followed by an analyzer in the light path so as to produce individual spatial light modulators having spatially varying light intensities. Therefore, it is possible to produce multiplication at any operating point of the polarizer-analyzer curve. The advantages of the system of this application are, first, the correlation may be used with a coherent light source, as will be explained with reference to FIG. 7, as well as with the non-coherent light source, shown in FIG. 6. Second, the magnitude of the available signal from the total correlator is greatly increased when operation occurs away from the polarizer-analyzer extinction point. The system of FIG. 6, therefore, provides for an increased output signal over the correlator shown in the copending application Ser. No. 632,757 filed Apr. 21, 1967 now U.S. Pat. No. 3,500,361.

The system of FIG. 6 has a particular difficulty in that the output signal from the integrating lens 178 includes several d-c error terms. Although these d-c error terms may be minimized, it would be desirable to eliminate these error terms completely. The coherent optical correlator of FIG. 7 may be used so as to eliminate the error terms. The coherent optical correlator system of FIG. 7 includes a source of coherent light 200, such as a laser, which directs light energy through an objective lens 202. The objective lens focuses light through a pinhole 204, and the light passing through the pinhole is then directed to a collimating lens 206. The use of the objective lens 202 and the pinhole 204, in combination with the collimating lens 206, allows for the expansion of the beam from the laser 200 without losing the coherency of the light beam.

The expanded beam of light energy from the collimating lens 206 is then directed through a polarizer 208 so as to adjust the plane of polarization. The light from the polarizer 208 passes through an optical prism 210 which supports a thin magnetic film 212. The magnetic pattern on the thin film 212 is controlled by a magnetic pattern generator 214 in the same manner as discussed above with reference to FIGS. 1 and 2. The output from the thin film 212, therefore, includes rotations in accordance with the pattern of information on the thin magnetic film 212. The output signal from the thin magnetic film 212 passes through an analyzer 216 so as to produce a spatially varying light signal having variations in intensity in accordance with the pattern of information on the thin magnetic film 212.

The polarity of the output light signal from the analyzer 216 is adjusted using a rotator such as the soliel compensator. As indicated above, the soliel compensator may be constructed of a first split piece of calcite, which includes two wedges 218 and 220, and a second piece of calcite 222. The first piece of calcite may have its thickness adjusted by varying the position of the wedges 218 and 220 so as to rotate the plane of polarization of the output signal from the soliel compensator.

The light output from the first light modulator, after having been rotated, may now be directed through a first transforming lens 224. The transforming lens 224 is used to eliminate the d-c error terms present in the signal from the first spatial light modulator. The d-c error terms may be eliminated since the image of the first transforming lens is the Fourier transform of the output light signal from the first light modulator and the transforming lens 224, therefore, produces a frequency spectrum of the output light signal from the first light modulator in the image plane. It is, therefore, possible to remove the d-c terms by properly positioning a d-c stop as shown by the stop 226. The desired light energy is, therefore, passed whereas the d-c error terms are eliminated. The desired light energy is then passed to a second transforming lens 228 which takes the inverse transform of the first transforming lens except for the sign and couples the reconstituted light energy except for the d-c error terms to the second magneto-optical spatial light modulator.

The second magneto-optical spatial light modulator includes the prism 230 which supports a thin magnetic film 232. A second magnetic pattern generator 234 produces a spatial magnetic pattern of information on the thin magnetic film 232 so as to modulate the light energy in accordance with the pattern of information. The spatially modulated light energy from the second thin magnetic film 232 is a correlation of the information from the first thin magnetic film 212 and the second thin magnetic film 232.

The output from the second film 232 is then passed through an analyzer 236 so as to produce a light signal having variations in intensity in accordance with the correlation. This varying light signal is then integrated by an integrating lens 238 and the output from the integrating lens is passed to the photodetector 240 so as to produce an output signal in accordance with the correlation of the information between the first thin magnetic film 212 and the second thin magnetic film 232. Since essentially all of the modulated light reaches the second light modulator but the unmodulated light is eliminated through the use of the d-c stop 238, there is no necessity for providing additional means for eliminating the d-c error terms. As indicated above, various types of spatial light modulators may be used with the system of FIGS. 6 and 7.

Figure 8:
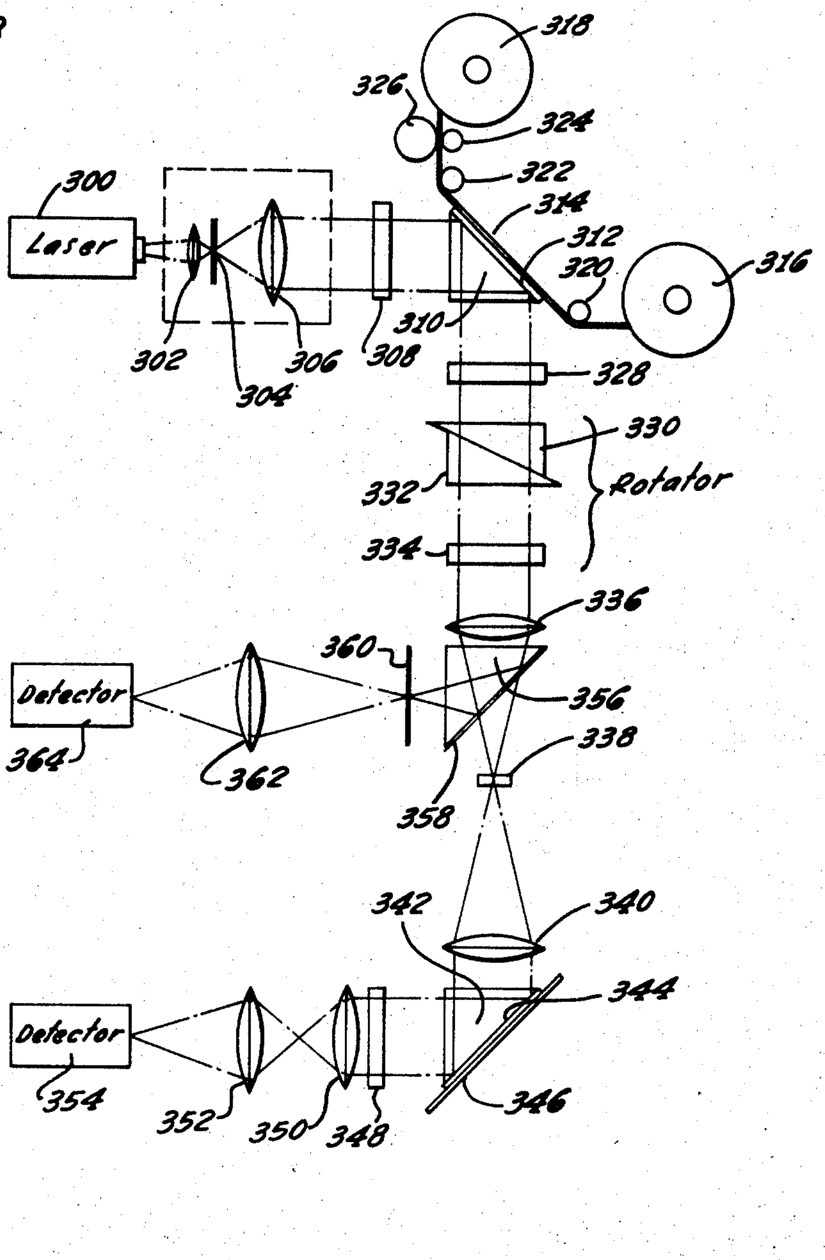
FIG. 8 is a general purpose optical signal processor constructed in accordance with the present invention and illustrating various methods of processing the optical signal.

FIG. 8 illustrates a general purpose optical signal processor which has certain elements similar to those shown in FIG. 7 but has additional elements to provide additional capabilities. In the general purpose optical signal processor of FIG. 8, a coherent light source such as a laser 300 produces a beam of coherent light energy. The beam of coherent light energy is directed to a beam expander including an objective lens 302, a pinhole 304 and a collimating lens 306. The light energy from the laser 300 is, therefore, focused by the objective lens 302 through the pinhole 304 and onto the collimating lens 306 so as to produce an expanded beam of collimated coherent light energy.

The beam of collimated coherent light energy is directed through a polarizer 308 so as to control the plane of polarization of the light energy. The polarized light energy is then directed to a first light modulator which includes an optical prism 310 supporting a thin magnetic film 312. A magnetic tape 314 is disposed adjacent to the thin magnetic film 312 so as to induce in the thin magnetic film 312 magnetic states corresponding to the magnetic states in the magnetic tape 314. The magnetic tape may be moved relative to the thin magnetic film 312 so as to produce a time varying spatial distribution of magnetic information in the thin magnetic film 312.

The magnetic tape 314 may be supplied from a supply reel 316 and taken up by a takeup reel 318. Idler wheels 320 and 322 control the position of the magnetic tape 314 so that the magnetic tape passes across the thin magnetic film 312. The magnetic tape 314 may be driven by a capstan drive system including a capstan 324 and a pinch roller 326. The speed of the magnetic tape 314 is controlled in accordance with the speed of rotation of the capstan 324 so that the magnetic tape may be controlled to move at a constant speed across the thin magnetic film 312.

The magnetic states in the thin magnetic film 312 control the rotation of the light energy directed to the thin film 312 at the various spatial positions. The rotated light energy is then directed through an analyzer 328 so as to produce an output signal having variations in intensity at different spatial positions in accordance with the pattern of information on the magnetic tape 314. The plane of polarization of the output signal from the analyzer 312 may be controlled by a rotator such as a soliel compensator which includes a first element including a pair of wedges 330 and 332 and a second element 334. The thickness of the pair of elements 330 and 332 is controlled by movement of these elements so as to produce the desired rotation of the plane of polarization of the light energy from the element 334. The light energy may be directed through a first transforming lens 336 which is used to produce a frequency spectrum of the light energy in the image plane. If there are any d-c error terms in the image plane, these error terms may be eliminated by a d-c stop 338. The second transforming lens 340 is used so as to reconstruct the image from the first spatial light modulator after the error terms have been removed.

The output from the second transforming lens 340 may now be directed through an optical prism 342 to a thin magnetic film 344. The spatial pattern of information on the thin magnetic film 344 may be controlled by a fixed piece of magnetic tape 346 or may be controlled by a moving magnetic tape similar to magnetic tape 314 used with the first spatial light modulator. Other means as indicated above may also be used so as to induce spatial patterns of information on the thin film 344. Depending upon the spatial patterns of information which are produced on the thin magnetic film 344, the optical processor of FIG. 8 may be used to operate as a correlator, filter, or other type of optical processor. For example, the Cheatham et al. and Cutrona et al. articles referred to above indicate various types of processing which may be accomplished with optical processors. The output from the thin magnetic film 344 is then directed through an analyzer 348 so as to produce an output signal having a spatial pattern of light intensity in accordance with the particular optical processing.

The output signal may be directed as shown through a pair of transforming lenses 350 and 352. It is to be appreciated that the lenses 350 and 352 represent a generalized lens structure which is known in the optical processing art so as to perform a particular transform operation. The output from the lens 352 is directed to a detector 354. The detector 354 may be an image dissector, a viewing screen or other type of light sensor.

The system of FIG. 8 also includes the pull-out prism 356 which is used to reflect a portion of the light energy. The prism 356 may include a half-silvered surface 358 so that a first portion of the light energy passes to the second spatial light modulator and a second portion of the light energy is reflected to a second detecting system. Since the first transforming lens 336 produces a frequency spectrum of the light energy, a viewing screen 360 may be inserted in the image plane so as to directly view the frequency spectrum of the light energy from the first light modulator. In addition to the visual viewing, the light energy may be focused by a lens 362 to a detector 364 which may be an image dissector, an image orthocon or other type of detector which produces an output signal in accordance with the frequency spectrum of the light energy.

It may, therefore, be seen that the system of FIG. 8 is a general purpose optical processor which may be used in accordance with known optical processing techniques to produce various processing of input information. As shown in FIG. 8, the first and second spatial light modulator may be used so that the input information may be correlated, filtered, analyzed, etc., in a desired manner. The present invention includes improvements in optical processing and includes the use of a magneto-optical spatial light modulator. The magneto-optical spatial light modulator allows for a more efficient modulation of the light energy, thereby eliminating the complexity and limitations in the prior art light modulators.

Figures 9, 10, 11:
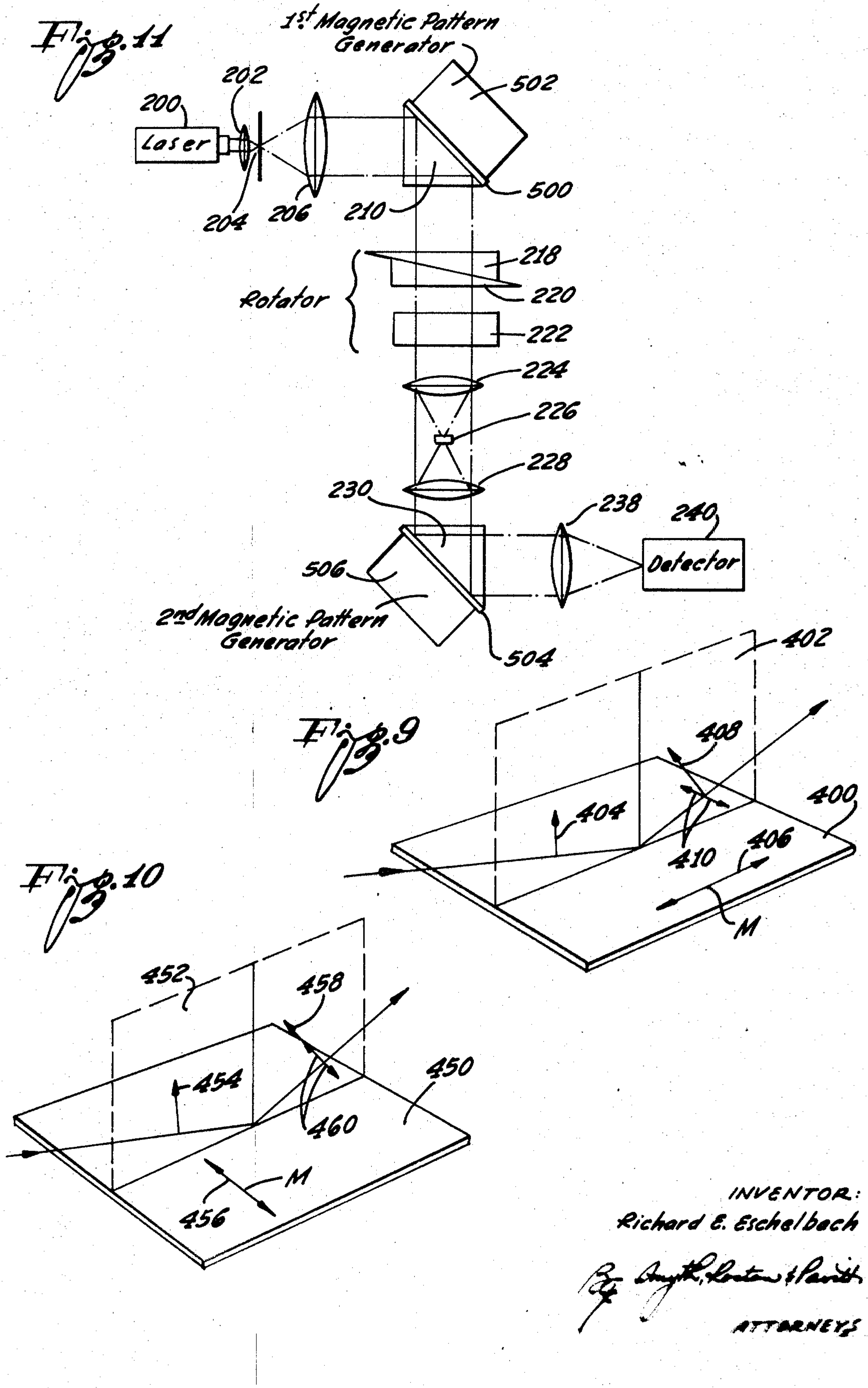
FIG. 9 illustrates the longitudinal Kerr magneto-optic effect.
FIG. 10 illustrates the transverse Kerr magneto-optic effect.
FIG. 11 illustrates the coherent optical correlator of FIG. 7 using the transverse Kerr magneto-optic effect of FIG. 10.

The preceding embodiments of the invention have been explained with the assumption that the magnetization of thin magnetic film was in a direction to produce the longitudinal Kerr magneto-optical effect which in turn produces changes in rotation of the light energy. The changes in rotation of the light energy are then converted to changes in intensity of the light energy for further optical processing. FIG. 9 illustrates this longitudinal Kerr magneto-optical effect. In FIG. 9, the thin magnetic film 400 represents any of the thin magnetic films shown in the preceding figures. The plane of incidence of the light energy is shown by the plane 402 and the various polarizers and rotators are used so as to align this plane of incidence. As can be seen in FIG. 9, the plane of incidence of the light energy is normal to the plane of the thin magnetic film 400. The particular light energy in the plane of incidence 402 directed toward the thin film 400 is represented by the arrow 404.

As indicated above, the light energy represented by the arrow 404 is polarized in the plane of incidence so that the arrow 404 lies within the plane of incidence 402. It is to be appreciated that the light energy 404 may be polarized in other planes. For example, the light energy may be polarized in a plane perpendicular to the plane of incidence 404. The thin magnetic film 400 is magnetized in a direction as shown by the arrow 406. As can be seen in FIG. 9, the magnetization of the thin film 400 is parallel to the plane of incidence 402 and this type of magnetization produces the longitudinal Kerr magneto-optical effect.

Upon reflection of the light energy 404 from the thin film 400, the reflected light includes a reflected component 408 which lies in the plane of incidence 402. In addition, a rotated component 410 is produced in accordance with the Kerr magneto-optical effect and the rotated component is perpendicular to the plane of incidence 404. The rotated component 410 is shown to be either in a positive or a negative direction depending upon the direction of magnetization as shown by the arrow 406. The resultant output signal which is represented by the vector summations of the arrows 408 and 410 is rotated either clockwise or counterclockwise away from the plane of incidence 420 in accordance with the direction of the rotated component 410.

The rotation of the light energy is, therefore, in accordance with the magnetization of the thin magnetic film 400 and the direction of rotation is in accordance with the direction of magnetization. The rotated light energy may now be passed through an analyzer which is set to pass light energy of a particular polarization which is related to the initial polarization of the light energy so as to produce variation in the intensity of the light energy in accordance with the rotations. Although the longitudinal Kerr magneto-optical effect in combination with the polarizer and analyzer produces a satisfactory intensity modulation of the output light energy, it would be desirable to provide for a direct intensity modulation of the light energy.

Such a direct intensity modulation may be produced by the use of the transverse Kerr magneto-optical effect as shown in FIG. 10. In FIG. 10, a thin magnetic film 450 again may represent any of the thin magnetic films shown in the previously described embodiments. The plane of incidence of the light energy is represented by the plane 452 and, as can be seen in FIG. 10, the plane of incidence is perpendicular to the plane of the thin magnetic film 450. The light energy impinging on the thin film 450 is polarized within the plane of incidence 452 and may be represented by the arrow 454. Again, as with FIG. 9, the light energy as represented by the arrow 454 is shown to have its polarization within the plane of incidence, but the light energy may actually have other polarizations.

The thin magnetic film 450 is magnetized in the transverse direction as shown by the arrow 456. As can be seen in FIG. 10, the magnetization is perpendicular to the plane of incidence, as opposed to the parallel magnetization shown in FIG. 9. When the light energy is reflected from the thin film 450, the output light energy includes two components. A first reflected component is shown by the arrow 458. This component lies within the plane of incidence 452. In addition to the reflected component, the Kerr magneto-optical component is shown by the arrow 460. Again, in FIG. 10 as with FIG. 9, the Kerr magneto-optical component may be in one of two opposite directions in accordance with the direction of magnetization of the thin magnetic film 450 as shown by the arrow 456. The arrow 460 is shown to extend in two directions. In FIG. 10, the Kerr magneto-optical component 460 lies within the plane of incidence 452. The Kerr magneto-optical component 460, therefore, either adds to or subtracts from the reflected component 458 thereby providing a direct intensity change in the output light energy. The use of the transverse Kerr magneto-optical effect as shown in FIG. 10, therefore, produces direct intensity modulations of the output light.

The transverse Kerr magneto-optical effect as shown in FIG. 10 may actually be used with any of the previously illustrated embodiments of the optical processor. As a specific example, the embodiment of FIG. 7 directed to a coherent optical correlator is shown in a modified form in FIG. 11 so as to use the transverse Kerr magneto-optical effect. In FIG. 11, similar elements have similar reference characters as in FIG. 7. In FIG. 11, the laser 200 produces coherent light energy which is directed through the objective lens 202. The light energy is focused through the pinhole 204 by the objective lens 202 so as to expand the beam from the laser 200. The expanded beam is then directed through the collimating lens 206 so as to produce an expanded beam of collimated coherent light energy. The collimated coherent light energy is polarized in a particular direction by the polarizer 208. The polarized light energy is then directed through the optical prism 210 so as to impinge on a thin magnetic film 500. The thin magnetic film 500 is provided with a spatial pattern of magnetic information by a first magnetic pattern generator 502. The pattern of magnetic information provided by the first magnetic pattern generator 502 on the thin magnetic film 500 is in a transverse direction, as shown in FIG. 10. The light energy reflected from the thin magnetic film 500, therefore, has intensity modulations in accordance with the pattern of magnetic information on the thin magnetic film 500. This intensity modulated light energy is then directed to the soliel compensator consisting of the split member including the two wedge elements 218 and 220 and the second element 222 so as to produce the desired rotation of the light energy.

The output light from the soliel compensator is directed through the transforming lens 224 so as to produce a frequency spectrum of the light energy. The frequency spectrum of the light energy is then filtered using the d-c stop 226 so as to remove d-c error components and the remaining light components are passed through the second transforming lens 228 so as to reconstitute the intensity modulated light energy. The intensity modulated light energy which has the error terms removed is now directed through the second optical prism 230 to impinge on the thin magnetic film 504. The thin magnetic film 504 has a spatial pattern of magnetic information induced in the thin film 504 by the second magnetic pattern generator 506. As with the first magnetic pattern generator 502, the second magnetic pattern generator 506 produces a transverse magnetization of the magnetic pattern of information on the thin magnetic film 504.

The output light reflected from the thin magnetic film 504, therefore, includes intensity modulations in accordance with the correlation of the information on the thin magnetic films 500 and 504. This correlated information is passed through an integrating lens 238 and is directed to the photodetector 240 so as to provide for an output signal in accordance with the correlation.

It is to be appreciated that the transverse Kerr magneto-optical effect may be used with the other embodiments of the invention illustrated in the various figures. It is also to be appreciated that the correlator shown in FIG. 11 and the other embodiments of the invention shown in the other figures may be varied so as to provide optical processing of a type other than correlating. For example, the embodiments may be modified so as to provide for additional filtering after the signal has been transformed or to provide for matched filtering in accordance with specific patterns induced in a pair of thin magnetic films.

The invention has been described with reference to particular embodiments, but various adaptations and modifications may be made. The invention, therefore, is only to be limited by the appended claims.

I claim:

1. A magneto-optical signal processor, including, a thin film of magnetic material having a hard axis of magnetization and disposed to provide magnetization along the hard axis, first means coupled to the thin film of magnetic material for producing a spatial pattern of magnetic information on the thin film in accordance with the magnetization of the thin film along the hard axis of magnetization, second means for producing light energy, third means coupled to the second means for receiving the light energy from the second means and for producing a beam of light from the light energy and for directing the beam of light toward the thin film to obtain from the thin film output light containing spatial variations in accordance with the spatial pattern of magnetic information on the thin film, optical processing means responsive to the spatial variations in the output light from the thin film of magnetic material for providing an optical Fourier transform of the spatial variations of the output light, and fourth means responsive to the optical Fourier transform of the spatial variations of the output light for providing at least a portion of an image of said optical Fourier transform of the spatial variations of the output light.

2. The magneto-optical signal processor of claim 1 wherein the second means produces non-coherent light energy.

3. The magneto-optical signal processor of claim 1 wherein the second means produces coherent light energy.

4. A magneto-optical signal processor, including, a thin film of magnetic material having a hard axis of magnetization and disposed to provide magnetization along the hard axis when the hard axis provides linear magnetization, first means coupled to the thin film of magnetic material for producing substantially linear changes in magnetization of the thin film along the hard axis of magnetization to provide a continuous spatial pattern of magnetic information on the thin film in accordance with such substantially linear changes in magnetization, second means for producing light energy, third means coupled to the second means for receiving the light energy from the second means and for producing a beam of light from the light energy and for directing the beam of light toward the thin film to produce output light from the thin film, fourth means coupled to the thin film to obtain the production of continuous spatial intensity modulations in the output light in accordance with the continuous spatial pattern of magnetic information on the thin film, optical processing means responsive to the continuous spatial intensity modulations of the output light from the thin film of magnetic material for providing an optical Fourier transform of the continuous spatial intensity modulations of the output light, and fifth means responsive to the optical Fourier transform of the continuous spatial intensity modulations of the output light for providing at least a portion of an image of the Fourier transform.

5. The magneto-optical signal processor of claim 4 wherein the fourth means is accomplished by the transverse recording of the spatial pattern of magnetic information on the thin film.

6. The magneto-optical signal processor of claim 4 wherein the fourth means is accomplished by an analyzer element placed in the path of the output light from the thin film.

7. A magneto-optical signal processor, including, a thin film of magnetic material having a hard axis of magnetization and disposed to provide magnetization along the hard axis, first means coupled to the thin film of magnetic material for producing substantially linear changes in magnetization of the thin film along the hard axis of magnetization to provide a continuously variable spatial pattern of magnetic information on the thin film in accordance with such substantially linear changes in magnetization, second means for producing light energy, third means coupled to the second means for receiving the light energy from the second means and for producing a beam of light from the light energy and for directing the beam of light toward the thin film to obtain from the thin film output light containing continuously variable spatial modulations in accordance with the continuously variable spatial modulations in accordance with the continuously variable spatial pattern of magnetic information on the thin film, optical processing means responsive to the output light from the thin film of magnetic material for providing an optical Fourier transform of the continuously variable spatial modulations of the output light, and fourth means responsive to the optical Fourier transform of the continuously variable spatial modulations of the output light for providing at least a portion of an image of the optical Fourier transform.

8. The magneto-optical signal processor of claim 7 wherein the optical processing means for providing the optical Fourier transform includes an optical lens.

9. The magneto-optical signal processor of claim 7 wherein the first means includes recorded magnetic tape which is moved relative to the thin film to induce the continuously variable spatial pattern of magnetic information on the thin film.

10. A magneto-optical signal processor, including, a thin film of magnetic material having a hard axis of magnetization and disposed to provide magnetization along the hard axis, first means coupled to the thin film of magnetic material for producing a continuously variable spatial pattern of magnetic information on the thin film along the hard axis of the thin film, second means for producing coherent light energy, third means coupled to the second means for receiving the coherent light energy from the second means and for producing a beam of coherent light from the light energy and for directing the beam of coherent light toward the thin film to obtain from the thin film output light containing continuous spatial variations in accordance with the spatial pattern of magnetic information on the thin film, optical processing means responsive to continuous spatial variations of the output light from the thin film of magnetic material for providing an optical Fourier tranform of the continuous spatial variations of the output light, and fourth means responsive to the optical Fourier transform of the continuous spatial variations of the output light for providing at least a portion of an image of the optical Fourier transform.

11. The magneto-optical signal processor of claim 10 wherein the optical processing means for providing the optical Fourier transform produces a frequency spectrum.

12. The magneto-optical signal processor of claim 11 wherein the fourth means includes means in the path of the optical Fourier transform of the continuous spatial variations of the output light to selectively intersect a portion of the frequency spectrum to eliminate any d-c error terms.

13. A magneto-optical signal processor, including, a thin film of magnetic material having a hard axis of magnetization and disposed to provide magnetization along the hard axis where the hard axis provides linear magnetization, first means coupled to the thin film of magnetic material for recording a linearly varying spatial pattern of magnetic information on the thin film along the hard axis of magnetization of the thin film, second means for producing light energy, third means coupled to the second means for receiving the light energy from the second means and for producing a beam of light from the light energy and for directing the beam of light toward the thin film to obtain from the thin film output light containing a linearly variable spatial pattern of magnetic information on the thin film in accordance with the linearly varying spatial pattern of magnetic information on the thin film along the hard axis, optical processing means responsive to the linearly variable spatial pattern of the output light from the thin film of magnetic material for providing an optical Fourier transform of the linearly variable spatial pattern of the output light, and fourth means responsive to the optical Fourier transform of the linearly variable spatial pattern of the output light for providing at least a portion of the image of the optical Fourier transform of the output light.

14. The magneto-optical signal processor of claim 13 wherein the first means includes recorded magnetic tape located adjacent to the thin film to induce the linearly variable spatial pattern of magnetic information on the thin film along the hard axis of magnetization of the thin film.

15. A magneto-optical signal processor, including, a thin film of magnetic material having a hard axis of magnetization and disposed to provide magnetization along the hard axis when the hard axis provides linear magnetization, first means coupled to the thin film of magnetic material for recording a continuously variable spatial pattern of magnetic information on the thin film along the hard axis of magnetization of thin film, second means for producing light energy, third means coupled to the second means for receiving the light energy from the second means and for producing a beam of light from the light energy and for directing the beam of light toward the thin film and for obtaining from the thin film output light containing continuously variable spatial modulations in accordance with the continuously variable spatial pattern of magnetic information on the thin film along the hard axis of magnetization of the thin film, optical processing means responsive to the continuously variable spatial modulations of the output light from the thin film of magnetic material for providing an optical Fourier transform of the continuously variable spatial modulations of the output light, and fourth means responsive to the optical Fourier transform of the continuously variable spatial modulations of the output light to provide at least a portion of an image of the optical Fourier transform of the output light.

16. The magneto-optical signal processor of claim 15 wherein the first means includes recorded magnetic tape located adjacent to the thin film to induce the continuously variable spatial pattern of magnetic information on the thin film along the hard axis of magnetization of the thin film.

17. A magneto-optical signal processor, including, a thin film of magnetic material having a hard axis of magnetization and disposed to provide magnetization along the hard axis where the hard axis provides linear magnetization, first means coupled to the thin film of magnetic material for producing a transversely polarized spatial pattern of magnetic information on the thin film along the hard axis of the thin film, second means for producing light energy, third means coupled to the second means for receiving the light energy from the second means and for producing a beam of light from the light energy and for directing the beam of light toward the thin film to obtain from the thin film output light containing spatial intensity modulations in accordance with the transversely polarized spatial pattern of magnetic information on the thin film, and optical processing means responsive to the spatial intensity modulations of the output light from the thin film of magnetic material for providing an optical Fourier transform of the spatial intensity modulations of the output light, and fourth means responsive to the optical Fourier transform of the spatial intensity modulations of the output light to provide at least a portion of an image of the optical Fourier transform of the output light.

18. The magneto-optical signal processor of claim 17 wherein the optical processing means includes an optical lens to produce the Fourier transform of the spatial intensity modulations of the output light.

19. A magneto-optical correlator, including, a first thin film of magnetic material having a hard axis of magnetization and disposed to provide magnetization along the hard axis where the hard axis provides linear magnetization, first means coupled to the first thin film of magnetic material for producing a continuously variable first spatial pattern of magnetic information on the first thin film along the hard axis, second means for producing light energy, third means coupled to the second means for receiving the light energy from the second means and for producing a collimated beam of light from the light energy and for directing the collimated beam of light toward the first thin film to produce output light from the first thin film, fourth means coupled to the first thin film to obtain the production of continuously variable spatial intensity modulations in the output light in accordance with the continuously variable first spatial pattern of magnetic information on the first thin film along the hard axis, a second thin film of magnetic material having easy and hard axes of magnetization and disposed to provide magnetization along the hard axis where the hard axis provides linear magnetization, fifth means coupled to the second thin film for producing a continuously variable second spatial pattern of magnetic information on the second thin film, the second thin film being responsive to the continuously variable spatial intensity modulations of the output light from the fourth means to correlate the spatial amplitude modulations in the output light from the fourth means with the second spatial pattern of magnetic information on the second thin film to produce output light from the second thin film in accordance with such correlations, and sixth means coupled to the second thin film to produce spatial intensity modulations in the output light from the second thin film in accordance with the correlation of the first and second spatial patterns of information.

20. The magneto-optical correlator of claim 19 wherein the second means for producing light energy produces coherent light energy.

21. A magneto-optical correlator, including, a first thin film of magnetic material, first means coupled to the first thin film of magnetic material for producing a first spatial pattern of magnetic information on the first thin film, second means for producing light energy, third means coupled to the second means for receiving the light energy from the second means and for producing a collimated beam of light from the light energy and with the collimated beam of light directed toward the first thin film to produce output light from the first thin film, fourth means coupled to the first thin film to produce spatial intensity modulations in the output light in accordance with the first spatial pattern of magnetic information on the first thin film, a second thin film of magnetic material, fifth means coupled to the second thin film for producing a second spatial pattern of magnetic information on the second thin film and with the second thin film responsive to the output light from the first thin film to correlate spatial amplitude modulations in the output light with the second spatial pattern of magnetic information of the second thin film to produce output light from the second thin film, and sixth means coupled to the second thin film to produce spatial intensity modulations in the output light from the second thin film in accordance with the correlation of the first and second spatial patterns of information, means intermediate the first and second thin films and in the path of the output light from the first thin film to transform the output light from the first thin film to produce a frequency spectrum.

22. A magneto-optical correlator, including, a first thin film of magnetic material, first means coupled to the first thin film of magnetic material for producing a first spatial pattern of magnetic information on the first thin film, second means for producing light energy, third means coupled to the second means for receiving the light energy from the second means and for producing a collimated beam of light from the light energy and with the collimated beam of light directed toward the first thin film to produce output light from the first thin film, fourth means coupled to the first thin film to produce spatial intensity modulations in the output light in accordance with the first spatial pattern of magnetic information on the first thin film, a second thin film of magnetic material, fifth means coupled to the second thin film for producing a second spatial pattern of magnetic information on the second thin film and with the second thin film responsive to the output light from the first thin film to correlate spatial amplitude modulations in the output light with the second spatial pattern of magnetic information of the second thin film to produce output light from the second thin film, and sixth means coupled to the second thin film to produce spatial intensity modulations in the output light from the second thin film in accordance with the correlation of the first and second spatial patterns of information, means intermediate the first and second thin films and in the path of the output light from the first thin film to transform the output light from the first thin film to produce a frequency spectrum, including means in the path of the frequency spectrum to intercept a portion of the frequency spectrum.

23. A magneto-optical signal processor, including, a thin film of magnetic material having easy and hard axes of magnetization and disposed to provide magnetization along the hard axis where the hard axis provides linear magnetization, first means coupled to the thin film of magnetic material for producing a longitudinally polarized spatial pattern of magnetic information on the thin film along the hard axis of the thin film, second means for producing light energy.

third means coupled to the second means for receiving the light energy from the second means and for producing a beam of light from the light energy and for directing the beam of light toward the thin film to obtain from the thin film output light containing spatial intensity modulations in accordance with the longitudinally polarized spatial pattern of magnetic information on the thin film, optical processing means responsive to the spatial intensity modulations of the output light from the thin film of magnetic material for providing an optical Fourier transform of the spatial intensity modulations of the output light, and fourth means responsive to the optical Fourier transform of the spatial intensity modulations of the output light to provide at least a portion of an image of the optical Fourier transform of the output light.

24. The magneto-optical signal processor of claim 23 wherein the optical processing means includes an optical lens to produce the Fourier transform of the spatial intensity modulations of the output light.

25. In the magneto-optical correlator set forth in claim 19, optical processing means responsive to the spatial modulations of the output light from the fourth means for providing an optical Fourier transform of such spatial intensity modulations before such spatial intensity modulations are directed to the second thin film.

26. In the magneto-optical correlator set forth in claim 21, optical processing means responsive to the spatial intensity modulations from the fourth means for providing an optical Fourier transform of such spatial modulations before such spatial intensity modulations are directed to the second thin film.

27. In the magneto-optical correlator set forth in claim 22, optical processing means responsive to the spatial intensity modulations from the fourth means for providing an optical Fourier transform of such spatial modulations before such spatial modulations are directed to the second thin film.

* * * * *